(12) United States Patent
Okuda et al.

(10) Patent No.: US 7,438,751 B2
(45) Date of Patent: *Oct. 21, 2008

(54) INK-JET INK SET

(75) Inventors: Satoshi Okuda, Kiyosu (JP); Ryuji Kato, Aisai (JP); Tatsuyoshi Nagase, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/859,658

(22) Filed: Sep. 21, 2007

(65) Prior Publication Data

US 2008/0072789 A1 Mar. 27, 2008

(30) Foreign Application Priority Data

Sep. 22, 2006 (JP) .............................. 2006-258027

(51) Int. Cl.
*C09D 11/02* (2006.01)
*B41J 2/01* (2006.01)

(52) U.S. Cl. ................................... 106/31.28; 347/100

(58) Field of Classification Search ............... 106/31.28; 347/100
See application file for complete search history.

(56) References Cited

U.S. PATENT DOCUMENTS

| | | | |
|---|---|---|---|
| 3,336,285 A | 8/1967 | Towne et al. | |
| 3,853,895 A | 12/1974 | Lamm et al. | |
| 3,907,769 A | 9/1975 | Dehnert et al. | |
| 3,950,321 A | 4/1976 | Dehnert et al. | |
| 3,998,802 A | 12/1976 | Dehnert et al. | |
| 4,016,152 A | 4/1977 | Dehnert et al. | |
| 4,042,578 A | 8/1977 | Dehnert et al. | |
| 4,068,085 A | 1/1978 | Ramanathan et al. | |
| 4,128,545 A | 12/1978 | Dehnert et al. | |
| 5,144,015 A | 9/1992 | Chapman | |
| 5,439,517 A * | 8/1995 | Yoshida et al. ............ | 106/31.48 |
| 5,803,958 A * | 9/1998 | Katsen et al. ............. | 106/31.65 |
| 6,277,184 B1 | 8/2001 | Kato | |
| 6,365,720 B1 | 4/2002 | Schacht | |
| 6,444,807 B1 | 9/2002 | Wolleb et al. | |
| 6,495,250 B1 | 12/2002 | Schacht | |
| 6,648,953 B2 * | 11/2003 | Yamazaki et al. ......... | 106/31.68 |
| 6,726,758 B2 * | 4/2004 | Sano ......................... | 106/31.6 |
| 6,846,353 B2 * | 1/2005 | Sano et al. ................. | 106/31.6 |
| 6,997,979 B2 * | 2/2006 | Bauer et al. ............... | 106/31.6 |
| 7,005,003 B2 * | 2/2006 | Mott et al. ................. | 106/31.6 |
| 7,033,423 B2 * | 4/2006 | Rolly ........................ | 106/31.13 |
| 7,204,873 B2 * | 4/2007 | Bauer et al. ............... | 106/31.6 |
| 7,217,315 B2 * | 5/2007 | Bauer et al. ............... | 106/31.6 |
| 2003/0105321 A1 | 6/2003 | Wolleb et al. | |
| 2006/0162614 A1 * | 7/2006 | Koganehira .............. | 106/31.28 |

FOREIGN PATENT DOCUMENTS

| | | |
|---|---|---|
| JP | S49-074718 A | 7/1974 |
| JP | S49-094677 A | 9/1974 |
| JP | S51-083631 A | 7/1976 |
| JP | H04-304270 A | 10/1992 |
| JP | H11-349876 A | 12/1999 |
| JP | 2000-303009 A | 10/2000 |
| JP | 2002-526589 A | 8/2002 |
| JP | 2002-285053 A | 10/2002 |
| WO | 00/17275 A1 | 3/2000 |

OTHER PUBLICATIONS

M. Elnagdi et al., Unity of Alpha, Beta-Unsaturated Nitriles In Heterocyclic Synthesis, Hetrocycles, vol. 20, No. 3 Mar. 1983.

* cited by examiner

*Primary Examiner*—Helene Klemanski
(74) *Attorney, Agent, or Firm*—Baker Botts L.L.P.

(57) ABSTRACT

The present disclosure relates to an ink-jet ink set which, in spite of using a black ink including a black pigment, may display desirable storage stability and/or may form printed matter (e.g., images) with desirable rub fastness against a plain paper surface, color balance after fading (fading stability), and/or water resistance. An ink set may include a yellow dye ink including a yellow dye, a magenta dye ink including a magenta dye, a cyan dye ink including a cyan dye and a black ink, the black ink including a black pigment and a yellow dye, a magenta dye, and a cyan dye. A black ink may have a weight ratio of the amount of the black pigment to the total amount of the yellow dye, the magenta dye, and the cyan dye of from about 95/5 to about 5/95.

19 Claims, No Drawings

INK-JET INK SET

This application claims the benefit of Japanese Patent Application No. 2006-258027, filed Sep. 22, 2006, which is incorporated herein by reference.

BACKGROUND

1. Field of the Invention

Embodiments of the present disclosure relate to an ink-jet ink set.

2. Description of Related Art

To develop a clear, full-color image by using an ink-jet recording method, an ink set composed of a yellow dye ink, a magenta dye ink, and a cyan dye ink may be used.

Printing black information using such an ink set can be performed by mixing three primary color inks. Because the printing costs may become high, the black information may be printed using, as a separate ink in the ink set, a black dye ink, which may be available at relatively low cost.

But, the black dye ink may lack sufficient light fastness, water resistance, and/or ozone resistance. For that reason, a black pigment (e.g., carbon black) that is more light-fast, water resistant, and/or ozone resistant may be used as a colorant of a black dye ink of an ink-jet ink set.

However, as compared with a black dye ink, the black pigment ink may not be sufficient in rub fastness of a printed matter. For example, when the printed matter is touched, e.g., by a finger, the black ink may adhere to the finger. Image quality also may be reduced (e.g., by smearing) when an image is rubbed by a finger and/or between papers.

In addition, where organic pigments or dyes are used, some fading of a color image may be inevitable. If the respective inks fade equally, image quality (e.g., color balance) may be preserved a little. But, because black pigment ink typically fades more slowly than color dye inks, black pigment ink may become unnaturally noticeable in faded color image areas. It has been proposed to use a black pigment (e.g., carbon black) in combination with a black dye (Japanese Patent Application Laid-Open No. H11-349876A).

But, because black dye and color dyes do not fade equally, the problem that a print portion of the black pigment ink becomes unnaturally noticeable from faded color image areas persists. It may be appropriate and/or desired for inks for ink-jet recording to be required to have storage stability and/or water resistance in a recorded image.

SUMMARY

The present disclosure relates, in some embodiments, to ink sets for ink-jet recording. According to some embodiments, an ink set may have rub fastness against a plain paper surface in spite of using a black ink comprising a black pigment as a coloring agent. A print portion of a black ink, in some embodiments, may not be unnaturally noticeable even after fading in print colors of a recorded image. An ink may have storage stability, and/or the recorded image may have water resistance in some embodiments.

The present inventors have found that an image formed with a black ink for ink-jet recording, which comprises, in addition to a black pigment, predetermined amounts of dyes (e.g., cyan, magenta, and yellow dyes), has improved rub fastness compared to an image formed with a black ink having black pigment alone. In addition, the present inventors have found that ink sets for ink-jet recording using color dye inks and a black ink, which uses the same color dyes in the color dye inks of the ink set as the dyes comprised in the black ink may have desirable fading properties.

The present disclosure also provides, in some embodiments, an ink-jet ink set comprising a yellow dye ink comprising a yellow dye, a magenta dye ink comprising a magenta dye, a cyan dye ink comprising a cyan dye, and a black ink comprising a black pigment. The black ink may comprise a black pigment, a yellow dye, a magenta dye, and a cyan dye, with a weight ratio of the amount of the black pigment to the total amount of the yellow dye, the magenta dye, and the cyan dye being from about 95/5 to about 5/95, from about 95/5 to about 30/70, and/or from about 70/30 to about 5/95. In some embodiments, the yellow dye(s) in the yellow dye ink may be the same as the yellow dye(s) in the black ink. Likewise, the magenta dye(s) in the magenta dye ink, in some embodiments, may be the same as the magenta dye(s) in the black ink. Similarly, the cyan dye(s) in the cyan dye ink may be the same as the cyan dye(s) in the black ink, in some embodiments. On the other hand, the colored dyes in the respective colored dye inks may differ from the colored dyes used in the black ink.

DETAILED DESCRIPTION

An ink-jet ink set, in some embodiments, may comprise a yellow dye ink comprising a yellow dye, a magenta dye ink comprising a magenta dye, a cyan dye ink comprising a cyan dye, and a black ink comprising a black pigment. A black ink may comprise, in addition to a black pigment, the same color dyes used in the color inks configuring the ink set. Moreover, a weight ratio of the amount of the black pigment to the total amount of the yellow dye, the magenta dye, and the cyan dye (BP: (YD+MD+CD)) maybe from about 5/95 to about 95/5, from about 5/95 to less than about 30/70, from about 30/70 to less than about 7/30, and/or from about 70/30 to about 95/5.

A weight ratio (Y/M/C) of the yellow dye (Y) to the magenta dye (M) to the cyan dye (C) in the black ink may be selected, according to some embodiments, such that a black-like color may be developed by these three kinds of color dyes. For example, although the weight ratio (Y/M/C) may vary according to the kinds of dyes used or the like, it may be about 1/(about 0.5 to about 2)/(about 0.5 to about 2), and/or about 1/(about 0.8 to about 1.2)/(about 0.8 to about 1.2).

In some embodiments of the disclosure, a colorimetric scale (e.g., an L*a*b* colorimetric system as described in Japanese Industrial Standard (JIS) Z8729 and established by the Commission International de l'Eclairage (CIE) in 1976) may be used to assess a color. For example, according to the L*a*b* colorimetric system, a color may be designated "black" where $-8 \leq a^* \leq 8, -8 \leq b^* \leq 8;$ $-5 \leq a^* \leq 5, -5 \leq b^* \leq 5;$ $-3 \leq a^* \leq 3, -3 \leq b^* \leq 3;$ and/or $a^*=0, b^*=0.$ A black pigment (e.g., comprised in a black ink), may comprise, in some embodiments, inorganic pigments such as carbon black, titanium oxide, iron oxide, and the like. In some embodiments, self-dispersion type pigments obtained by surface treating a pigment with a surfactant, a polymeric dispersant or the like, for example, graft carbon may be used. As the self-dispersion type pigment, commercially available products may be used. Examples of self-dispersion type pigments may include, without limitation, CAB-O-JET® 200 and 300, which are manufactured by Cabot Corporation, and BON-JET® BLACK CW-1 and CW-2, which are manufactured by Orient Chemical Industries, Ltd. Also, black dyes such as C.I. Food Black 2 and the like may be used jointly within a desired range.

In some embodiments, a yellow dye (e.g., a yellow dye which is a coloring agent of a yellow dye ink) may comprise direct dyes, acid dyes, and the like which are generally used in an ink for ink-jet recording. A yellow dye ink may comprise a yellow pigment within a range sufficient to achieve a desired property (e.g., rub fastness, storage stability, water resistance, and/or fading stability) in an ink set and/or an image.

Water resistance, in some embodiments, may refer to resistance to and/or prevention of any type of ink bleeding, blurring, spreading, and/or extraction (collectively "blurring") by a solvent (e.g., water).

In some embodiments, a magenta dye (e.g., a magenta dye which is a coloring agent of a magenta dye ink) may comprise direct dyes, acid dyes, and the like which are generally used in an ink for ink-jet recording. A magenta dye, in some embodiments, may comprise a dye (1) represented by the following general formula (1), which may yield desirable light fastness and/or ozone resistance. A magenta dye ink may comprise a magenta pigment within a range sufficient to achieve a desired property (e.g., rub fastness, storage stability, water resistance, and/or fading stability) in an ink set and/or an image.

General Formula (1)

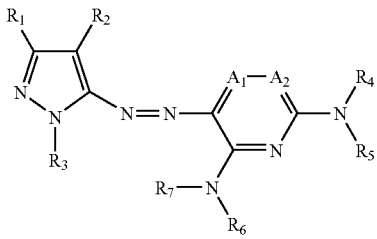

In the general formula (1), $R_1$ represents a hydrogen atom, an optionally substituted alkyl group or an optionally substituted aryl group. $R_2$ represents a hydrogen atom, a halogen atom or a cyano group. $R_3$ represents a hydrogen atom, an optionally substituted alkyl group, an optionally substituted aryl group or an optionally substituted heterocyclic group. $R_4$, $R_5$, $R_6$, and $R_7$ each independently represents a hydrogen atom, an optionally substituted alkyl group, an optionally substituted aryl group, an optionally substituted heterocyclic group, an optionally substituted sulfonyl group or an optionally substituted acyl group. However, $R_4$ and $R_5$ are not a hydrogen atom at the same time; and $R_6$ and $R_7$ are not a hydrogen atom at the same time. All of $A_1$ and $A_2$ are an optionally substituted carbon atom; or one of $A_1$ and $A_2$ is an optionally substituted carbon atom, with the other being a nitrogen atom.

The substituents $R_1$ to $R_7$, $A_1$, and $A_2$ in the general formula (1) are described.

Examples of the halogen atom in the general formula (1) include a fluorine atom, a chlorine atom, a bromine atom, and the like.

In the general formula (1), the alkyl group in the optionally substituted alkyl group may be an alkyl group having from 1 to 6 carbon atoms. Examples of the substituent include a hydroxyl group, an alkoxy group (for example, a methoxy group, an ethoxy group, and the like), a cyano group, a halogen atom, (for example, a fluorine atom, a chlorine atom, a bromine atom, and the like), and an ionic hydrophilic group (for example, carboxylates, sulfonates, and the like). Examples of the optionally substituted alkyl group include, without limitation, a methyl group, an ethyl group, an n-butyl group, an isopropyl group, a tert-butyl group, a hydroxyethyl group, a methoxyethyl group, a cyanoethyl group, a trifluoromethyl group, a 3-sulfopropyl group, a 4-sulfobutyl group, and the like.

In the general formula (1), the aryl group in the optionally substituted aryl group may be an aryl group having from 6 to 12 carbon atoms exclusive of the carbon atom(s) of the substituent. Examples of the substituent include an alkyl group (for example, a methyl group, an ethyl group, an isopropyl group, a tert-butyl group, an n-octyl group, and the like), an alkoxy group (refer to the examples described previously), a halogen atom (refer to the examples described previously), an alkylamino group (for example, a methylamino group, a dimethylamino group, and the like), an amide group, a carbamoyl group, a sulfamoyl group, a sulfonamide group, a hydroxyl group, an ester group (for example, a methoxycarbonyl group, an ethoxycarbonyl group, and the like), and an ionic hydrophilic group (refer to the examples described previously). Examples of the optionally substituted aryl group include, without limitation, a phenyl group, a naphthyl group, a p-tolyl group, a p-octylphenyl group, a mesityl group, a p-methoxyphenyl group, an o-chlorophenyl group, an m-(3-sulfopropylamino)phenyl group, and the like.

In the general formula (1), the heterocyclic group in the optionally substituted heterocyclic group may be a 5-membered or 6-membered ring heterocyclic group. Examples of the substituent include an amide group, a carbamoyl group, a sulfamoyl group, a sulfoamide group, a hydroxyl group, an ester group (refer to the examples described previously), and an ionic hydrophilic group (refer to the examples described previously). Examples of the optionally substituted heterocyclic group include, without limitation, a 2-pyridyl group, a 2-thienyl group, a 2-thiazolyl group, a 2-benzothiazolyl group, a 2-furyl group, a 6-sulfobenzothiazolyl group, a 6-sulfonate benzothiazolyl group, and the like).

In the general formula (1), examples of the substituent of the optionally substituted sulfonyl group include an alkyl group (refer to the examples described previously), an aryl group (refer to the examples described previously), and the like. Examples of the optionally substituted sulfonyl group include, without limitation, a methylsulfonyl group, a phenylsulfonyl group, and the like.

In the general formula (1), the acyl group of the optionally substituted acyl group may be an acyl group having from 1 to 12 carbon atoms exclusive of the carbon atom(s) of the substituent. Examples of the substituent include an ionic hydrophilic group (refer to the examples described previously). Examples of the optionally substituted acyl group include, without limitation, an acetyl group, a benzoyl group, a chloroacetyl group, and the like.

In the general formula (1), as described previously, all of $A_1$ and $A_2$ are an optionally substituted carbon atom; or one of $A_1$ and $A_2$ is an optionally substituted carbon atom, with the other being a nitrogen atom. Desired performance may be achieved where both $A_1$ and $A_2$ are a carbon atom. Examples of the substituent binding to the carbon atom of $A_1$ and $A_2$ include, without limitation, an alkyl group having from 1 to 3 carbon atoms, a carboxyl group, a carbamoyl group, a cyano group, and the like.

In the general formula (1), $R_4$ and $R_5$ are not a hydrogen atom at the same time; and $R_6$ and $R_7$ are not a hydrogen atom at the same time. Because when the number of substituents of the sulfonic group or carboxyl group increases, water solubility of the dye (1) may be enhanced, the number of substituents may be adjusted to achieve a desired and/or required water solubility.

In some embodiments, a dye may comprise a dye according to the general formula (1), in which $R_1$ is an alkyl group; $R_2$ is a cyano group; $R_3$ is a hydrogen atom or an optionally substituted heterocyclic group; $R_4$ is a hydrogen atom, an optionally substituted heterocyclic group, or a substituted aryl group; $R_5$ and $R_6$ are each a substituted heterocyclic group or a substituted aryl group; $R_7$ is a hydrogen atom; $A_1$ is a substituted carbon atom; and $A_2$ is an optionally substituted carbon atom.

In some embodiments, a dye may comprise a dye according to the general formula (1), in which $R_1$ is a tert-butyl group; $R_2$ is a cyano group; $R_3$ is a hydrogen atom or a benzothiazolyl group which may be substituted with a sulfonic group or an alkali metal salt of sulfonic group (for example, a benzothiazol-2-yl group); $R_4$ is a hydrogen atom, a benzothiazolyl group which may be substituted with a sulfonic group or an alkali metal salt of sulfonic group (for example, a benzothiazol-2-yl group), or a trialkylphenyl group substituted with a sulfonic group or an alkali metal salt of sulfonic group (for example, a mesityl group); $R_5$ and $R_6$ are each independently a mono- or trialkylphenyl group which may be substituted with a sulfonic group or an alkali metal salt of sulfonic group (for example, a p-octylphenyl group, and a mesityl group) or a benzothiazolyl group substituted with a sulfonic group or an alkali metal salt of sulfonic group (for example, a benzothiazol-2-yl group); $R_7$ is a hydrogen atom; $A_1$ is a carbon atom substituted with an alkyl group (for example, a methyl group); and $A_2$ is a carbon atom which may be substituted with a cyano group.

Examples of the dye (1) include, without limitation, compounds represented by the following chemical formulae (1-A) to (1-E).

Chemical Formula (1-A)

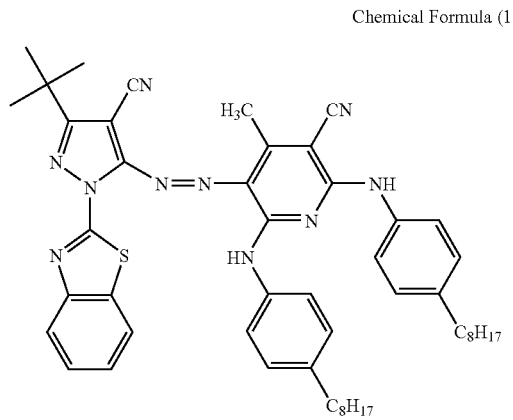

The compound represented by the chemical formula (1-A) is an embodiment in which in the general formula (1), $R_1$ is a tert-butyl group; $R_2$ is a cyano group; $R_3$ is a benzothiazol-2-yl group; $R_4$ is a hydrogen atom; $R_5$ and $R_6$ are each a p-octylphenyl group; $R_7$ is a hydrogen atom; $A_1$ is a carbon atom substituted with a methyl group; and $A_2$ is a carbon atom substituted with a cyano group.

Chemical Formula (1-B)

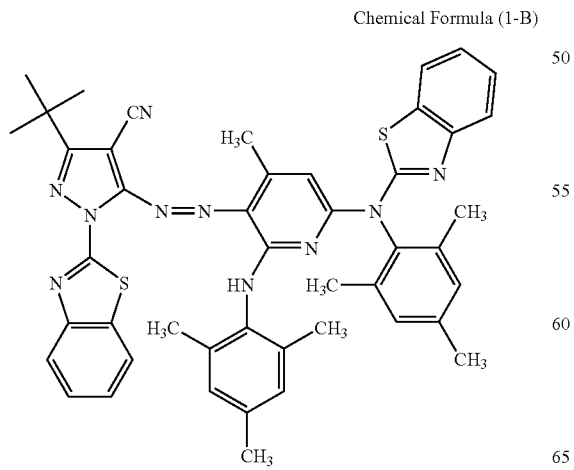

The compound represented by the chemical formula (1-B) is an embodiment in which in the general formula (1), $R_1$ is a tert-butyl group; $R_2$ is a cyano group; $R_3$ and $R_4$ are each a benzothiazol-2-yl group; $R_5$ and $R_6$ are each a mesityl group; $R_7$ is a hydrogen atom; $A_1$ is a carbon atom substituted with a methyl group; and $A_2$ is a carbon atom.

Chemical Formula (1-C)

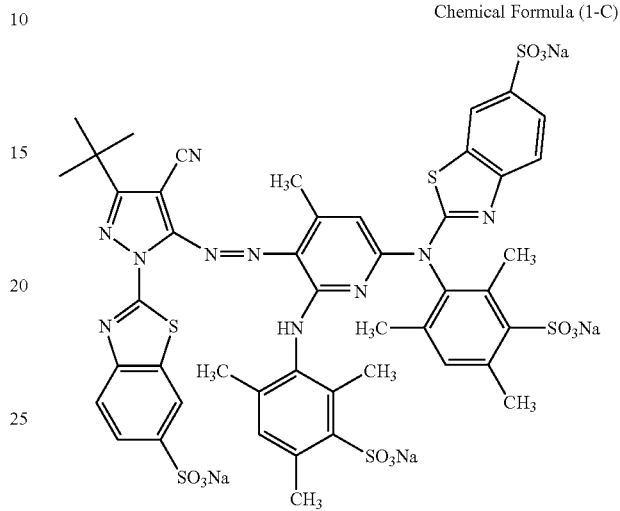

The compound represented by the chemical formula (1-C) is an embodiment in which in the general formula (1), $R_1$ is a tert-butyl group; $R_2$ is a cyano group; $R_3$ and $R_4$ are each a 6-sulfosodium salt-benzothiazol-2-yl group; $R_5$ and $R_6$ are each a 3-sulfosodium salt-mesityl group; $R_7$ is a hydrogen atom; $A_1$ is a carbon atom substituted with a methyl group; and $A_2$ is carbon atom.

Chemical Formula (1-D)

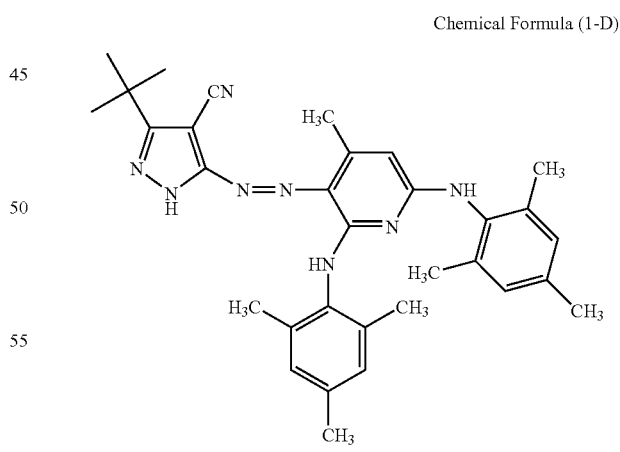

The compound represented by the chemical formula (1-D) is an embodiment in which in the general formula (1), $R_1$ is a tert-butyl group; $R_2$ is a cyano group; $R_3$ and $R_4$ are each a hydrogen atom; $R_5$ and $R_6$ are each a mesityl group; $R_7$ is a hydrogen atom; $A_1$ is a carbon atom substituted with a methyl group; and $A_2$ is a carbon atom.

Chemical Formula (1-E)

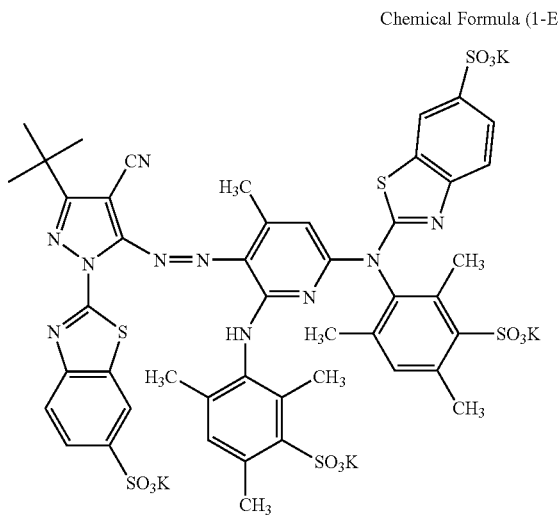

The compound represented by the chemical formula (1-E) is an embodiment in which in the general formula (1), $R_1$ is a tert-butyl group; $R_2$ is a cyano group; $R_3$ and $R_4$ are each a 6-sulfopotassium salt-benzothiazol-2-yl group; $R_5$ and $R_6$ are each a 3-sulfopotassium salt-mesityl group; $R_7$ is a hydrogen atom; $A_1$ is a carbon atom substituted with a methyl group; and $A_2$ is a carbon atom.

The dye (1) represented by the general formula (1) may be produced in accordance with steps (a) to (c) as described below.

Step (a)

An aminopyrazole represented by the following chemical formula (1a) is allowed to react with a diazotization agent to form a diazonium salt. As the diazotization agent, a dilute hydrochloric acid aqueous solution of sodium nitrite may be used. Isopentyl nitrite, nitrosyl sulfuric acid, and the like may be used.

Chemical Formula (1a)

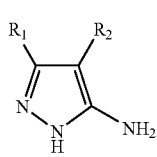

In the chemical formula (1a), the substituents $R_1$ and R2 are the same as those in the dye (1) as described previously. The aminopyrazole represented by the chemical formula (1a) may be synthesized by a method described in U.S. Pat. No. 3,336, 285, Heterocycles, 20, 519 (1983), Japanese Patent Publication No. H06-19036B and the like.

Step (b)

Subsequently, the diazonium salt formed in the step (a) is allowed to react with a coupling agent represented by the following chemical formula (1b) to form a compound represented by the following chemical formula (1c).

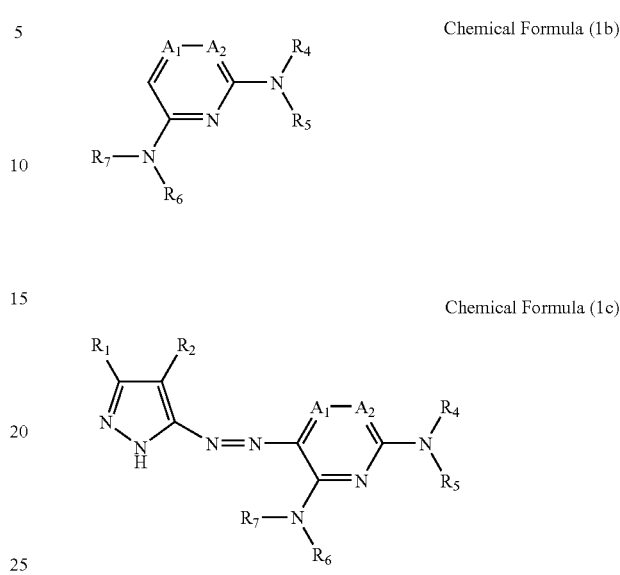

In the chemical formulae (1b) and (1c), the substituents $R_1$ to $R_7$ are the same as those in the dye (1) as described previously. The pyridine based coupling agent represented by the chemical formula (1c) may be synthesized by a method described in Japanese Patent Application Laid-Open No. S51-83631A, Japanese Patent Application Laid-Open No. S49-74718A, Japanese Patent Publication No. S52-46230B, and the like.

Step (c)

Subsequently, the compound formed in the step (b) is allowed to react with an alkylating agent, an arylating agent or a heterylating agent in the presence of a base to obtain the dye (1) represented by the general formula (1). As the base which is used in this step, an organic base such as diisopropylethylamine, and the like; an inorganic base such as potassium carbonate, sodium carbonate, sodium hydrogencarbonate, potassium hydrogencarbonate, sodium hydroxide, potassium hydroxide, and the like; and the like may be used. The alkylating agent is a compound represented by R—X. Here, R represents an optionally substituted alkyl group; and X represents a halogen atom or $OSO_2R'$, wherein R' represents an alkyl group or an aryl group such as a phenyl group, and the like. The arylating agent is a compound represented by Ar—X. Here, Ar represents a phenyl group substituted with an electron-withdrawing group (e.g., substituted with a substituent having a total sum of Hammett's $\sigma_p$ values of 0.2 or more). The heterylating agent is a compound represented by Het-X. Here, Het represents a hetero ring. Examples of the hetero ring include, without limitation, a 2-pyridyl group, a 2-thienyl group, a 2-thaizolyl group, a 2-benzothiazolyl group, a triazyl group, a 2-furyl group, and the like.

In some embodiments, a cyan dye (e.g., a cyan dye which is a coloring agent of a cyan dye ink) may comprise direct dyes, acid dyes, and the like which are generally used in an ink for ink-jet recording. A cyan dye may comprise a cyan dye (2) represented by the following general formula (2), which may display desirable light-fastness and/or ozone resistance. A cyan dye ink may comprise a cyan pigment within a range sufficient to achieve a desired property (e.g., rub fastness, storage stability, water resistance, and/or fading stability) in an ink set and/or an image.

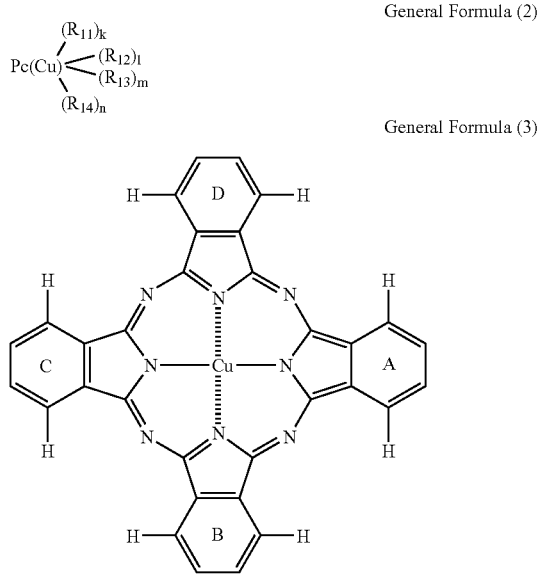

General Formula (2)

General Formula (3)

In the general formula (2), Pc(Cu) represents a copper phthalocyanine nucleus represented by the general formula (3). In the general formula (2), $R_{11}$, $R_{12}$, $R_{13}$, and $R_{14}$ each independently represents a substituent selected from —$SO_2$—$R_a$, —$SO_2NR_bR_c$, and —$CO_2$—$R_a$, wherein all of $R_{11}$, $R_{12}$, $R_{13}$, and $R_{14}$ are not the same each other at the same time. However, at least one of $R_{11}$, $R_{12}$, $R_{13}$, and $R_{14}$ contains an ionic hydrophilic group as the substituent. At least one of $R_{11}$, $R_{12}$, $R_{13}$, and $R_{14}$ is present in each of the four benzene rings A, B, C, and D in the copper phthalocyanine nucleus represented by the general formula (3). $R_a$ represents a substituted or unsubstituted alkyl group; $R_b$ represents a hydrogen atom or a substituted or unsubstituted alkyl group; and $R_c$ represents a substituted or unsubstituted alkyl group. k represents a number which is satisfied with (0<k<8); l represents a number which is satisfied with (0<l<8); m represents a number which is satisfied with (0≦m<8); n represents a number which is satisfied with (0≦n<8); and k, l, m, and n are each a number which is satisfied with (4≦k+l+m+n≦8).

The substituents $R_{11}$ to $R_{14}$, Pc (Cu), k, l, m, and n in the general formula (2) are described.

In the general formula (2), examples of the substituted or unsubstituted alkyl group represented by $R_a$, $R_b$, and $R_c$ include a linear chain, branched chain, and/or an alicyclic alkyl group having from 1 to 12 carbon atoms. To enhance solubility of a dye and/or stability of an ink, a branched chain alkyl group may be used. For example, a branched chain alkyl group with an asymmetric carbon (e.g., used in a racemate) may be used.

Examples of the substituent in the substituted alkyl group represented by $R_a$, $R_b$ or $R_c$ include a linear chain or branched chain alkyl group having from 1 to 12 carbon atoms, a linear chain or branched chain aralkyl group having from 7 to 18 carbon atoms, a linear chain or branched chain alkenyl group having from 2 to 12 carbon atoms, a linear chain or branched chain alkynyl group having from 2 to 12 carbon atoms, a linear chain or branched chain cycloalkyl group having from 3 to 12 carbon atoms, and/or a linear chain or branched chain cycloalkenyl group having from 3 to 12 carbon atoms (in each of these groups, solubility of the dye and/or stability of the ink may be enhanced by using a branched chain, e.g., a branched chain comprising an asymmetric carbon; examples thereof include, without limitation, methyl, ethyl, propyl, isopropyl, sec-butyl, tert-butyl, 2-ethylhexyl, 2-methylsulfonylethyl, 3-phenoxypropyl, trifluoromethyl, and/or cyclopentyl); a halogen atom (for example, a chlorine atom and/or a bromine atom); an aryl group (for example, phenyl, 4-tert-butylphenyl, and/or 2,4-di-tert-amylphenyl); a heterocyclic group (for example, imidazolyl, pyrazolyl, triazolyl, 2-furyl, 2-thienyl, 2-pyrimidinyl, and/or 2-benzothiazolyl); a cyano group; a hydroxyl group; a nitro group; a carboxyl group; an amino group; an alkyloxy group (for example, methoxy, ethoxy, 2-methoxyethoxy, and/or 2-methanesulfonylethoxy); an aryloxy group (for example, phenoxy, 2-methylphenoxy, 4-tert-butylphenoxy, 3-nitrophenoxy, and/or 3-tert-butyloxycarbamoylphenoxy); an acylamino group (for example, acetamide, benzamide, and/or 4-(3-tert-butyl-4-hydroxyphenoxy)butanamide); an alkyamino group (for example, methylamino, butylamino, diethylamino, and/or methylbutylamino); an anilino group (for example, phenylamino and/or 2-chloroanilino); an ureido group (for example, phenylureido, methylureido, and/or N,N-dibutylureido); a sulfamoylamino group (for example, N,N-dipropylsulfamoylamino); an alkylthio group (for example, methylthio, octylthio, and/or 2-phenoxyethylthio); an arylthio group (for example, phenylthio, 2-butoxy-5-tert-octylphenylthio, and/or 2-carboxyphenylthio); an alkyloxycarbonylamino group (for example, methoxycarbonylamino); a sulfonamide group (for example, methanesulfonamide, benzenesulfonamide, and/or p-toluenesulfonamide), a carbamoyl group (for example, N-ethylcarbamoyl and/or N,N-dibutylcarbamoyl); a sulfamoyl group (for example, N-ethylsulfamoyl, N,N-dipropylsulfamoyl, and/or N-phenylsulfamoyl); a sulfonyl group (for example, methanesulfonyl, octanesulfonyl, benzenesulfonyl, and/or toluenesulfonyl); an alkyloxycarbonyl group (for example, methoxycarbonyl and/or butyloxycarbonyl); a heterocyclic oxy group (for example, 1-phenyltetrazol-5-oxy and/or 2-tetrahydropyranyloxy); an azo group (for example, phenylazo, 4-methoxyphenylazo, 4-pivaloylaminophenylazo, and/or 2-hydroxy-4-propanoylphenylazo); an acyloxy group (for example, acetoxy); a carbamoyloxy group (for example, N-methylcarbamoyloxy and/or N-phenylcarbamoyloxy); a silyloxy group (for example, trimethylsilyloxy and/or dibutylmethylsilyloxy), an aryloxycarbonylamino group (for example, phenoxycarbonylamino); an imide group (for example, N-succinimide and/or N-phthalimide); a heterocyclic thio group (for example, 2-benzothiazolylthio, 2,4-diphenoxy-1,3,5-triazole-6-thio, and/or 2-pyridylthio); a sulfinyl group (for example, 3-phenoxypropylsulfinyl); a phosphonyl group (for example, phenoxyphosphonyl, octyloxyphosphonyl, and/or phenylphosphonyl); an aryloxycarbonyl group (for example, phenoxycarbonyl); an acyl group (for example, acetyl, 3-phenylpropanoyl, and/or benzoyl); and/or an ionic hydrophilic group (for example, a carboxyl group, a sulfo group, a phosphono group, and/or a quaternary ammonium group). Of these, a hydroxyl group, a group comprising an ether bond or an ester bond, a cyano group, and/or a sulfonamide group may be used to enhance association properties and/or enhance fastness of the dye. These groups may also comprise a halogen atom and/or an ionic hydrophilic group.

Examples of such a substituted or unsubstituted alkyl group represented by $R_a$, $R_b$ or $R_c$ include, without limitation, a methyl group, an ethyl group, an n-butyl group, an isopropyl group, a tert-butyl group, a hydroxyethyl group, a methoxyethyl group, a cyanoethyl group, a trifluoromethyl group, a 3-sulfopropyl group, a 4-sulfobutyl group, and the like.

In some embodiments, a dye may comprise a dye according to the general formula (2), in which $R_{11}$, $R_{12}$, $R_{13}$, and $R_{14}$ are each a substituent represented by $-SO_2-R_a$, wherein $R_a$ which each of $R_{11}$, $R_{12}$, $R_{13}$, and $R_{14}$ contains a substituted or unsubstituted alkyl group, but all of the substituted or unsubstituted alkyl groups of the four $R_a$ groups are not completely the same each other. Here, "all of the substituted or unsubstituted alkyl groups of the four $R_a$ groups are not completely the same each other" means that at least two types of $R_a$ are present on the premise that at least one of the four $R_a$ groups is a substituted alkyl group comprises an ionic hydrophilic group.

In some embodiments, a dye may comprise a dye according to the general formula (2), in which k represents a number which is satisfied with (0<k<4); l represents a number which is satisfied with (0<l<4); m represents a number which is satisfied with (0<m<4); n represents a number which is satisfied with (0≦n<4); and k, l, m, and n are each a number which is satisfied with (k+l+m+n=4).

Examples of the dye (2) include, without limitation, compounds represented by the following chemical formulae (2-A) to (2-E).

Chemical Formula (2-A)

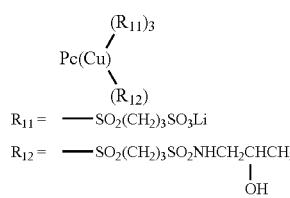

$R_{11} = -SO_2(CH_2)_3SO_3Li$ $R_{12} = -SO_2(CH_2)_3SO_2NHCH_2CHCH_3$
                                    |
                                    OH

The compound represented by the chemical formula (2-A) is an embodiment in which in the general formula (2), $R_{11}$ is a lithium sulfonatopropylsulfonyl group; $R_{12}$ is an N-(2-hydroxypropyl)sulfamoylpropylsulfonyl group; k is 3; l is 1; and m and n are each 0.

Chemical Formula (2-B)

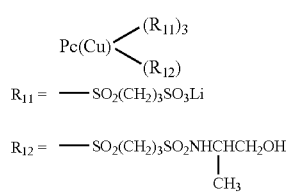

$R_{11} = -SO_2(CH_2)_3SO_3Li$ $R_{12} = -SO_2(CH_2)_3SO_2NHCHCH_2OH$
                                  |
                                  CH_3

The compound represented by the chemical formula (2-B) is an embodiment in which in the general formula (2), $R_{11}$ is a lithium sulfonatopropylsulfonyl group; $R_{12}$ is an N-(2-hydroxyisopropyl)sulfamoylpropylsulfonyl group; k is 3; l is 1; and m and n are each 0.

Chemical Formula (2-C)

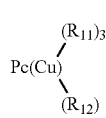

-continued $R_{11} = -SO_2(CH_2)_3SO_3Li$

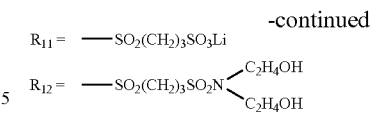

The compound represented by the chemical formula (2-C) is an embodiment in which in the general formula (2), $R_{11}$ is a lithium sulfonatopropylsulfonyl group; $R_{12}$ is an N,N-(di(2-hydroxyethyl))sulfamoylpropylsulfonyl group; k is 3; l is 1; and m and n are each 0.

Chemical Formula (2-D)

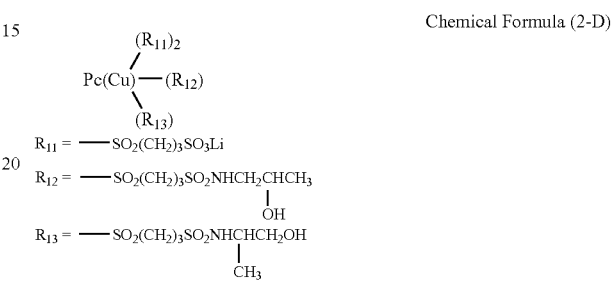

$R_{11} = -SO_2(CH_2)_3SO_3Li$ $R_{12} = -SO_2(CH_2)_3SO_2NHCH_2CHCH_3$
                                    |
                                    OH $R_{13} = -SO_2(CH_2)_3SO_2NHCHCH_2OH$
                                   |
                                   CH_3

The compound represented by the chemical formula (2-D) is an embodiment in which in the general formula (2), $R_{11}$ is a lithium sulfonatopropylsulfonyl group; $R_{12}$ is an N-(2-hydroxypropyl)sulfamoylpropylsulfonyl group; $R_{13}$ an N-(2-hydroxyisopropyl)sulfamoylpropylsulfonyl group; k is 2; l is 1; m is 1; and n is 0.

Chemical Formula (2-E)

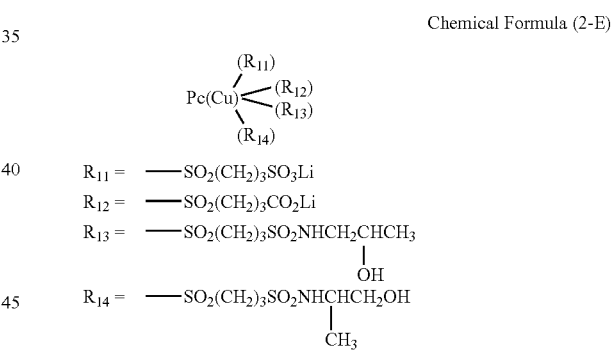

$R_{11} = -SO_2(CH_2)_3SO_3Li$ $R_{12} = -SO_2(CH_2)_3CO_2Li$ $R_{13} = -SO_2(CH_2)_3SO_2NHCH_2CHCH_3$
                                    |
                                    OH $R_{14} = -SO_2(CH_2)_3SO_2NHCHCH_2OH$
                                   |
                                   CH_3

The compound represented by the chemical formula (2-E) is an embodiment in which in the general formula (2), $R_{11}$ is a lithium sulfonatopropylsulfonyl group; $R_{12}$ is a lithium carboxylatopropylsulfonyl group; $R_{13}$ is an N-(2-hydroxypropyl)sulfamoylpropylsulfonyl group; $R_{14}$ is an N-(2-hydroxyisopropyl)sulfamoylpropylsulfonyl group; and k, l, m, and n are each 1.

A method of producing the dye (2) represented by the general formula (2) is hereunder described. In general, as described in Japanese Translation of PCT International Application No. 2002-526589 (WO 00/17275) or the like, when an unsubstituted phthalocyanine compound is sulfonated, a sulfo group may be relatively easily introduced into a phthalocyanine nucleus. In the case of using the sulfonated phthalocyanine compound as a water-soluble dye, the sulfo group is subjected to salt formation with an alkali metal hydroxide such as sodium hydroxide to form a sulfonate, and the sulfonate may be used as a dye as it is. In that case, not only sulfonation possibly occurs in any position on the phthalocyanine nucleus, but also it is difficult to control the number of sulfo groups to be introduced. Accordingly, in the case of performing the sulfonation under a reaction condition by taking into consideration only the ease of sulfonation without taking into consideration the position of introduction of the sulfo group and the number of sulfo groups to be introduced, it may be difficult to specify the position and/or number of the sulfo groups introduced in a reaction product, and a mixture of compounds different in the number and substitution position of the substituents may be obtained. Then, in order to enhance the ozone resistance of the dye (2), it may be desirable and/or necessary to prevent a product which is inferior in ozone resistance from being mixed. Accordingly, by introducing a specified substituent in advance into a phthalic acid derivative according to the usual way and allowing this substituted phthalic acid derivative to react with a copper derivative such as $CuCl_2$ and the like according to a method described in Japanese Patent Application Laid-Open No. JP-2000-303009A, it may be possible to produce the copper phthalocyanine represented by the general formula (2).

Water and a water-soluble organic solvent for configuring each of the inks of the ink set are described.

According to some embodiments of the disclosure, water may comprise ion exchange water low in salts. Because water in each ink of an ink set may be formulated as the balance of other components, the amount included may vary depending on the amounts of other components. The amount of water may be generally about 10 wt. % to about 90 wt. % and/or about 40 wt. % to about 80 wt %.

In some embodiments, a water-soluble organic solvent may comprise a humectant and/or a penetrant. A humectant may prevent drying of ink at the tip of a nozzle of an ink-jet head. A penetrant may act as a penetrant for controlling a drying speed of ink on a paper surface.

Examples of a humectant may include, without limitation, lower alcohols such as methyl alcohol, ethyl alcohol, n-propyl alcohol, isopropyl alcohol, n-butyl alcohol, sec-butyl alcohol, tert-butyl alcohol, and the like; polyhydric alcohols such as 1, 3-butanediol, 1,5-pentanediol, 1,6-hexanediol, glycerin, 1,2,6-hexanetriol, 1,2,4-butanetriol, 1,2,3-butanetriol, pentantriol, and the like; alkylene glycols such as ethylene glycol, diethylene glycol, triethylene glycol, propylene glycol, dipropylene glycol, tripropylene glycol, butylene glycol, thiodiglycol, hexylene glycol, and the like; polyalkylene glycols such as polyethylene glycol, polypropylene glycol, and the like; amides such as formamide, N-methylformamide, N,N-dimethylformamide, dimethyl acetamide, and the like; amines such as monoethanolamine, diethanolamine, triethanolamine, monoethylamine, diethylamine, triethylamine, and the like; ketones or keto alcohols such as acetone, diacetone alcohol, and the like; ethers such as tetrahydrofuran, dioxane, and the like; pyrrolidones such as 2-pyrrolidone, N-methyl-2-pyrrolidone, N-hydroxyethyl-2-pyrrolidone, and the like; nitrogen-containing heterocyclic compounds such as 1,3-dimethylimidazolidinone, ε-caprolactam, and the like; and sulfur-containing compounds such as dimethyl sulfoxide, sulforane, thiodiethanol, and the like. Of these, polyhydric alcohols such as alkylene glycols and/or glycerin may be used.

The amount of the humectant in each of the inks of the ink set may be generally from 0 wt. % to about 95 wt. %, from about 10 wt. % to about 80 wt. %, and/or from about 10 wt. % about to 50 wt. %. Such a humectant may be used singly or in admixture of two or more kinds thereof.

Examples of a penetrant include, without limitation, ethylene glycol methyl ether, ethylene glycol ethyl ether, ethylene glycol propyl ether, ethylene glycol butyl ether, diethylene glycol methyl ether, diethylene glycol ethyl ether, diethylene glycol propyl ether, diethylene glycol butyl ether, diethylene glycol dimethyl ether, diethylene glycol diethyl ether, diethylene glycol dipropyl ether, diethylene glycol dibutyl ether, triethylene glycol methyl ether, triethylene glycol ethyl ether, triethylene glycol propyl ether, triethylene glycol butyl ether, triethylene glycol dimethyl ether, triethylene glycol diethyl ether, triethylene glycol dipropyl ether, triethylene glycol dibutyl ether, propylene glycol methyl ether, propylene glycol ethyl ether, propylene glycol propyl ether, propylene glycol butyl ether, dipropylene glycol methyl ether, dipropylene glycol ethyl ether, dipropylene glycol propyl ether, dipropylene glycol butyl ether, dipropylene glycol dimethyl ether, dipropylene glycol diethyl ether, dipropylene glycol dipropyl ether, dipropylene glycol dibutyl ether, tripropylene glycol methyl ether, tripropylene glycol ethyl ether, tripropylene glycol propyl ether, tripropylene glycol butyl ether, tripropylene glycol dimethyl ether, tripropylene glycol diethyl ether, tripropylene glycol dipropyl ether, tripropylene glycol dibutyl ether, and the like.

The amount of the penetrant in each of the inks of the ink set may be generally from 0 wt. % to about 20 wt. %, from about 0.1 wt. % to about 15 wt. %, and/or from about 1 wt. % to about 10 wt. %. When the amount of the penetrant is in excess, penetrability of the ink into paper become excessively high, resulting in blurring. Such a penetrant may be used singly or in admixture of two or more kinds thereof.

In some embodiments, each ink of an ink set may further comprise one or more additives such as, for example, a viscosity modifier (for example, polyvinyl alcohol, polyvinylpyrrolidone, water-soluble resins, and the like), a surface tension modifier, a mildew-proofing agent, a pH modifier, and the like.

Each ink of an ink set may be produced by uniformly mixing the coloring agents and optionally, water, a water-soluble organic solvent, and/or various other additives according to a routine method to prepare each of the inks and setting these inks.

EXAMPLES

The following examples are provided only to illustrate certain embodiments of the description and are not intended to embody the total scope of the disclosure or any embodiment thereof. Variations of the exemplary embodiments below are intended to be included within the scope of the disclosure.

Examples 1 to 6 and Comparative Examples 1 to 5

Ink compositions summarized in Tables 1 and 2 were uniformly mixed to prepare an ink for ink-jet recording. Here, Dyes (1-A) to (1-E) correspond to the compounds represented by the chemical formulae (1-A) to (1-E), respectively; and Dyes (2-A) to (2-E) correspond to the compounds represented by the chemical formulae (2-A) to (2-E), respectively.

The resulting ink set was evaluated for (1) rub fastness against a plain paper surface, (2) storage stability, (3) water resistance, (4) color balance after fading (fading stability), and (5) overall quality as described below. Results are summarized in Table 3.

(1) Rub Fastness Against Plain Paper Surface:

A black ink was filled in a predetermined ink cartridge, which was then installed in an ink-jet printer-mounted digital multifunction device (DCP-110C, manufactured by Brother Industries, Ltd.); text printing was performed on m-real's DATA COPY paper; after elapsing 30 seconds after printing, the printed paper was rubbed by a finger to visually observe rub of the ink; and influences against the image were evaluated according to the following criteria.

AA: Ink smearing upon rubbing was not observed at all.

A: Ink smearing upon rubbing was not substantially noticeable.

B: Ink smearing upon rubbing was slightly observed, but there was no problem in practical use.

C: Ink smearing upon rubbing was noticeable so that the ink was unsuited for practical use.

(2) Evaluation of Storage Stability:

A black ink was sealed within a glass container and allowed to stand in a thermostatic chamber at 60° C. for 14 days. Subsequently, the ink was collected from a bottom of the glass container, and the presence or absence of aggregates was evaluated by microscopic observation according to the following criteria.

A: Aggregates were not substantially present.

B: Aggregates were slightly present, but there was no problem in practical use.

C: A lot of aggregates were present so that the ink was unsuited for practical use.

(3) Evaluation of Water Resistance:

A black ink was filled in a predetermined ink cartridge, which was then installed in an ink-jet printer-mounted digital multifunction device (DCP-110C, manufactured by Brother Industries, Ltd.), thereby preparing an evaluation sample. As the evaluation sample, a gradation sample of the black ink was printed on m-real's DATA COPY paper, thereby obtaining a 5 cm-square print patch having an initial OD (optical density) value of 1.0. After allowing this print patch to stand for 10 minutes, it was dipped in tap water for 5 minutes. After dipping, the print patch was spontaneously dried for 24 hours, and a density of ink transfer of a non-recording part and ink remaining of a recording part were visually evaluated according to the following criteria.

AA: Blurring of the ink was not observed at all.

A: Blurring of the ink was not substantially noticeable.

B: Blurring of the ink was slightly observed, but there was no problem in practical use.

C: Blurring of the ink was noticeable so that the ink was unsuited for practical use.

(4) Evaluation of Color Balance of Printed Matter After Fading (Fading Stability):

(4-1) Printing:

By combining a black ink and a color ink set summarized in Tables 1 and 2, an ink-jet ink set of each of the Examples and Comparative Examples summarized in Table 3 was formed. Each of the inks was filled in a predetermined ink cartridge, which was then installed in an ink-jet printer-mounted digital multifunction device (DCP-110C, manufactured by Brother Industries, Ltd.) to prepare an evaluation sample. As the evaluation sample, a gradation sample with respect to each of the four color inks was printed on glossy paper (photographic glossy paper (model number: BP6OGLA), manufactured by Brother Industries, Ltd.) to obtain a print patch having an initial OD value of 1.0.

(4-2) Light Fastness Test:

A light-fastness test was performed by using the evaluation sample. The light fastness test was performed by using a high-energy xenon weather meter SC750-WN, manufactured by Suga Test Instruments Co., Ltd., and irradiating light emitted from a xenon lamp as a light source at chamber temperature of 25° C. and at chamber humidity of 50% RH with an illuminance of 93,000 Lux for 100 hours. With respect to the print patches of four colors each exhibiting an OD value of 1.0 before the test, an OD value after the light fastness test was measured. The OD value was measured by using Spectrolino, manufactured by Gretag Macbeth (light source: $D_{65}$, field of view: 2°, status: A). With respect to the print patches each exhibiting an OD value of 1.0 before the test, a reduction rate of OD value of OD value was determined according to the following equation.

[Reduction rate of OD value (%)]={[1.0 (OD value before the test)−(OD value after the test)]/1.0 (OD value before the test)}×100

(4-3) Ozone Resistance Test:

An ozone resistance test was performed by using the evaluation sample. The ozone resistance test was performed by using an ozone weather meter OMS-H, manufactured by Suga Test Instruments Co., Ltd., and allowing the evaluation sample to stand in an ozone concentration of 1 ppm at a chamber temperature of 24° C. and at chamber humidity of 60% RH for 40 hours. With respect to the print patches of four colors each exhibiting an OD value of 1.0 before the test, an OD value after the ozone resistance test was measured. The OD value was measured by using Spectrolino, manufactured by Gretag Macbeth (light source: $D_{65}$, field of view: 20, status: A). With respect to the print patches each exhibiting an OD value of 1.0 before the test, a reduction rate of OD value was determined according to the foregoing equation.

(4-4) Evaluation:

The reduction rate of OD value obtained by each of the light fastness test and the ozone resistance test was evaluated according to the following criteria.

A: Not only the order of the reduction rates of OD value of the three color inks was identical with the order of the reduction rates of OD value of the yellow, magenta, and cyan components in the black ink in all the light fastness test and the ozone resistance test, but also the reduction rate of OD value of black was within 10% in all the light fastness test and the ozone resistance test.

B: Though the order of the reduction rates of OD value of the three color inks was identical with the order of the reduction rates of OD value of the yellow, magenta, and cyan components in the black ink in all the light fastness test and the ozone resistance test, the reduction rate of OD value of black exceeds 10% in either one of or all the light fastness test and the ozone resistance test.

C: The order of the reduction rates of OD value of the three color inks was different from the order of the reduction rates of OD value of the yellow, magenta, and cyan components in the black ink in at least one of the light fastness test and the ozone resistance test.

(5) Overall Quality:

With respect to the ink sets of the Examples and Comparative Examples, the overall quality was performed according to the following criteria.

Excellent: All the evaluation results were rated as "AA" or "A".

Good: Either one of the evaluation results was rated as "B" but not "C".

Poor: Either one of the evaluation results was rated as "C".

TABLE 1

| | | | | Bk-1 | Bk-2 | Bk-3 | Bk-4 | Bk-5 | Bk-6 |
|---|---|---|---|---|---|---|---|---|---|
| Black ink | Weight ratio of pigment and dye (pigment/dye) | | | 95/5 | 90/10 | 85/15 | 80/20 | 70/30 | 80/20 |
| | Total amount of coloring agent (wt. %) | | | 4.0 | 4.0 | 4.0 | 4.0 | 4.0 | 4.0 |
| Black ink composition (wt. %) | Black | Pigment | CAB-O-JET ® 300*[1] | 3.8 | 3.6 | 3.4 | 3.2 | 2.8 | 3.2 |
| | | Dye | C.I. Food Black 2 | — | — | — | — | — | — |
| | Yellow | Dye | C.I. Direct Yellow 86 | 0.06 | 0.14 | 0.18 | 0.25 | 0.39 | — |
| | | | C.I. Acid Yellow 23 | — | — | — | — | — | 0.26 |
| | Magenta | Dye | Dye (1-A) | 0.07 | — | — | — | — | — |
| | | | Dye (1-B) | — | 0.13 | — | — | — | — |
| | | | Dye (1-C) | — | — | 0.20 | — | — | — |
| | | | Dye (1-D) | — | — | — | 0.27 | — | — |
| | | | Dye (1-E) | — | — | — | — | 0.40 | — |
| | | | C.I. Direct Red 227 | — | — | — | — | — | 0.28 |
| | Cyan | Dye | Dye (2-A) | 0.07 | — | — | — | — | — |
| | | | Dye (2-B) | — | 0.13 | — | — | — | — |
| | | | Dye (2-C) | — | — | 0.22 | — | — | — |
| | | | Dye (2-D) | — | — | — | 0.28 | — | — |
| | | | Dye (2-E) | — | — | — | — | 0.41 | — |
| | | | C.I. Acid Blue 9 | — | — | — | — | — | 0.26 |
| | Glycerin | | | 27.0 | 27.0 | 27.0 | 27.0 | 27.0 | 27.0 |
| | Triethylene glycol butyl ether | | | 5.0 | 5.0 | 5.0 | 5.0 | 5.0 | 5.0 |
| | OLFINE ® E1010*[2] | | | 0.2 | 0.2 | 0.2 | 0.2 | 0.2 | 0.2 |
| | Water | | | Balance | Balance | Balance | Balance | Balance | Balance |
| Evaluation | Rub fastness against plain paper surface | | | B | A | A | A | A | A |
| | Storage stability | | | A | A | A | A | B | A |
| | Water resistance | | | AA | AA | AA | AA | A | AA |

| | | | | Bk-7 | Bk-8 | Bk-9 | Bk-10 | Bk-11 |
|---|---|---|---|---|---|---|---|---|
| Black ink | Weight ratio of pigment and dye (pigment/dye) | | | 100/0 | 0/100 | 80/20 | 80/20 | 80/20 |
| | Total amount of coloring agent (wt. %) | | | 4.0 | 4.0 | 4.0 | 4.0 | 4.0 |
| Black ink composition (wt. %) | Black | Pigment | CAB-O-JET ® 300*[1] | 4.0 | — | 3.2 | 3.2 | 3.2 |
| | | Dye | C.I. Food Black 2 | — | — | — | — | 0.8 |
| | Yellow | Dye | C.I. Direct Yellow 86 | — | 1.32 | 0.25 | — | — |
| | | | C.I. Acid Yellow 23 | — | — | — | 0.25 | — |
| | Magenta | Dye | Dye (1-A) | — | 1.33 | 0.28 | — | — |
| | | | Dye (1-B) | — | — | — | — | — |
| | | | Dye (1-C) | — | — | — | — | — |
| | | | Dye (1-D) | — | — | — | — | — |
| | | | Dye (1-E) | — | — | — | — | — |
| | | | C.I. Direct Red 227 | — | — | — | 0.28 | — |
| | Cyan | Dye | Dye (2-A) | — | 1.35 | — | — | — |
| | | | Dye (2-B) | — | — | — | — | — |
| | | | Dye (2-C) | — | — | — | — | — |
| | | | Dye (2-D) | — | — | — | — | — |
| | | | Dye (2-E) | — | — | — | — | — |
| | | | C.I. Acid Blue 9 | — | — | 0.27 | 0.27 | — |
| | Glycerin | | | 27.0 | 27.0 | 27.0 | 27.0 | 27.0 |
| | Triethylene glycol butyl ether | | | 5.0 | 5.0 | 5.0 | 5.0 | 5.0 |
| | OLFINE ® E1010*[2] | | | 0.2 | 0.2 | 0.2 | 0.2 | 0.2 |
| | Water | | | Balance | Balance | Balance | Balance | Balance |
| Evaluation | Rub fastness against plain paper surface | | | C | AA | A | A | A |
| | Storage stability | | | A | A | A | A | A |
| | Water resistance | | | AA | C | AA | AA | AA |

*[1] Calculated as a pigment concentration (CAB-O-JET ® 300 has a pigment solids content concentration of 15%), manufactured by Cabot Corporation
*[2] Acetylene glycol based surfactant, manufactured by Nissin Chemical Industry Co., Ltd.

TABLE 2

| | | | Color ink set-1 | | | Color ink set-2 | | | Color ink set-3 | | |
|---|---|---|---|---|---|---|---|---|---|---|---|
| | | | Yellow ink | Magenta ink | Cyan ink | Yellow ink | Magenta ink | Cyan ink | Yellow ink | Magenta ink | Cyan ink |
| Ink composition (wt. %) | Yellow dye | C.I. Direct Yellow 86 | 2.5 | — | — | 2.5 | — | — | 2.5 | — | — |
| | | C.I. Acid Yellow 23 | — | — | — | — | — | — | — | — | — |
| | Magenta dye | Dye (1-A) | — | 2.5 | — | — | — | — | — | — | — |
| | | Dye (1-B) | — | — | — | — | 2.5 | — | — | — | — |
| | | Dye (1-C) | — | — | — | — | — | — | — | 2.5 | — |
| | | Dye (1-D) | — | — | — | — | — | — | — | — | — |
| | | Dye (1-E) | — | — | — | — | — | — | — | — | — |
| | | C.I. Direct | — | — | — | — | — | — | — | — | — |

TABLE 2-continued

|  |  |  | | | | | | | | | |
|---|---|---|---|---|---|---|---|---|---|---|---|
| | Cyan dye | Dye (2-A) | — | — | 2.5 | — | — | — | — | — | — |
| | | Dye (2-B) | — | — | — | — | — | 2.5 | — | — | — |
| | | Dye (2-C) | — | — | — | — | — | — | — | — | 2.5 |
| | | Dye (2-D) | — | — | — | — | — | — | — | — | — |
| | | Dye (2-E) | — | — | — | — | — | — | — | — | — |
| | | C.I. Acid Blue 9 | — | — | — | — | — | — | — | — | — |
| | Glycerin | | 27.0 | 27.0 | 27.0 | 27.0 | 27.0 | 27.0 | 27.0 | 27.0 | 27.0 |
| | Triethylene glycol butyl ether | | 5.0 | 5.0 | 5.0 | 5.0 | 5.0 | 5.0 | 5.0 | 5.0 | 5.0 |
| | OLFINE ® E1010*[1] | | 0.2 | 0.2 | 0.2 | 0.2 | 0.2 | 0.2 | 0.2 | 0.2 | 0.2 |
| | Water | | Balance | Balance | Balance | Balance | Balance | Balance | Balance | Balance | Balance |

| | | | Color ink set-4 | | | Color ink set-5 | | | Color ink set-6 | | |
|---|---|---|---|---|---|---|---|---|---|---|---|
| | | | Yellow ink | Magenta ink | Cyan ink | Yellow ink | Magenta ink | Cyan ink | Yellow ink | Magenta ink | Cyan ink |
| Ink composition (wt. %) | Yellow dye | C.I. Direct Yellow 86 | 2.5 | — | — | 2.5 | — | — | — | — | — |
| | | C.I. Acid Yellow 23 | — | — | — | — | — | — | 2.5 | — | — |
| | Magenta dye | Dye (1-A) | — | — | — | — | — | — | — | — | — |
| | | Dye (1-B) | — | — | — | — | — | — | — | — | — |
| | | Dye (1-C) | — | — | — | — | — | — | — | — | — |
| | | Dye (1-D) | — | 2.5 | — | — | — | — | — | — | — |
| | | Dye (1-E) | — | — | — | — | 2.5 | — | — | — | — |
| | | C.I. Direct Red 227 | — | — | — | — | — | — | — | 2.5 | — |
| | Cyan dye | Dye (2-A) | — | — | — | — | — | — | — | — | — |
| | | Dye (2-B) | — | — | — | — | — | — | — | — | — |
| | | Dye (2-C) | — | — | — | — | — | — | — | — | — |
| | | Dye (2-D) | — | — | 2.5 | — | — | — | — | — | — |
| | | Dye (2-E) | — | — | — | — | — | 2.5 | — | — | — |
| | | C.I. Acid Blue 9 | — | — | — | — | — | — | — | — | 2.5 |
| | Glycerin | | 27.0 | 27.0 | 27.0 | 27.0 | 27.0 | 27.0 | 27.0 | 27.0 | 27.0 |
| | Triethylene glycol butyl ether | | 5.0 | 5.0 | 5.0 | 5.0 | 5.0 | 5.0 | 5.0 | 5.0 | 5.0 |
| | OLFINE ® E1010*[1] | | 0.2 | 0.2 | 0.2 | 0.2 | 0.2 | 0.2 | 0.2 | 0.2 | 0.2 |
| | Water | | Balance | Balance | Balance | Balance | Balance | Balance | Balance | Balance | Balance |

*[1] Acetylene glycol based surfactant, manufactured by Nissin Chemical Industry Co., Ltd.

TABLE 3

| | | Example 1 | Example 2 | Example 3 | Example 4 | Example 5 | Example 6 |
|---|---|---|---|---|---|---|---|
| Ink set | Black ink | Bk-1 | Bk-2 | Bk-3 | Bk-4 | Bk-5 | Bk-6 |
| | Color ink set | Color ink set-1 | Color ink set-2 | Color ink set-3 | Color ink set-4 | Color ink set-5 | Color ink set-6 |
| | Identity of dye *1 | Yes | Yes | Yes | Yes | Yes | Yes |
| Evaluation | Black ink Rub fastness against plain paper surface | B | A | A | A | A | A |
| | Storage stability | A | A | A | A | B | A |
| | Water resistance | AA | AA | AA | AA | A | AA |
| | Color balance of printed matter after fading | A | A | A | A | A | B |
| | Overall quality | Good | Excellent | Excellent | Excellent | Good | Good |

| | | Comparative Example 1 | Comparative Example 2 | Comparative Example 3 | Comparative Example 4 | Comparative Example 5 |
|---|---|---|---|---|---|---|
| Ink set | Black ink | Bk-7 | Bk-8 | Bk-9 | Bk-10 | Bk-11 |
| | Color ink set | Color ink set-1 | Color ink set-1 | Color ink set-1 | Color ink set-1 | Color ink set-1 |
| | Identity of dye *1 | — | Yes | No | No | No |
| Evaluation | Black ink Rub fastness against plain paper surface | C | AA | A | A | A |
| | Storage stability | A | A | A | A | A |
| | Water resistance | AA | C | AA | AA | AA |
| | Color balance of printed matter after fading | A | B | C | C | C |
| | Overall quality | Poor | Poor | Poor | Poor | Poor |

*1: Identity between the dyes in the black ink and the dyes in each of the color inks configuring the ink set
Yes: All dyes in each color ink are the same as the color dyes used in the black ink.
No: The dyes in each color ink of the color ink set are not used at all or partially used as the color dyes of the black ink.
A dye is not used in the black ink.

The results summarized in Table 3 indicate that the ink sets of Examples 1 to 6 have favorable properties (rub fastness, storage stability, water resistance, fading stability) without problems in practical use.

The ink set of Comparative Example 1 having a high ratio of the black pigment in the coloring agents of the black ink was not sufficient with respect to rub fastness against plain paper surface. Inversely, the ink set of Comparative Example 2 having a high ratio of the dyes was insufficient with respect to the water resistance of the printed matter. Also, in the case of the ink sets of Comparative Examples 3 and 4, the color dyes in the black ink are different from the color dyes in the color dye inks configuring the ink set. Consequently, the order of light fastness and ozone resistance of the yellow dye, the magenta dye, and the cyan dye of the color dye inks was different from the order of light fastness and ozone resistance of the yellow, magenta, and cyan components in the black ink. As the evaluation results indicate, the color balance of printed matter after fading (fading stability) was not favorable. Furthermore, in the case of the ink set of Comparative Example 5 in which the black ink comprises a black dye, but not a color dye, the color balance of the printed matter after fading (fading stability) was not favorable. As a result, the overall quality of each of the ink sets of Comparative Examples 1 to 5 was not satisfactory.

Although embodiments of the present disclosure have been described in detail herein, the scope of the disclosure is not limited thereto. It will be appreciated by those of ordinary skill in the relevant art that various modifications may be made without departing from the scope of the disclosure. Accordingly, the embodiments disclosed herein are exemplary. It is to be understood that the scope of the disclosure is not to be limited thereby, but is to be determined by the claims which follow.

What is claimed is:

1. An ink-jet ink set comprising:
   a black ink comprising a black pigment, a first yellow dye, a first magenta dye, and a first cyan dye, with a weight ratio of the amount of the black pigment to the total amount of the first yellow dye, the first magenta dye and the first cyan dye being from about 95/5 to about 5/95;
   a yellow dye ink comprising a second yellow dye;
   a magenta dye ink comprising a second magenta dye; and
   a cyan dye ink comprising a second cyan dye.

2. An ink-jet ink set according to claim 1, wherein the weight ratio of the amount of the black pigment to the total amount of the first yellow dye, the first magenta dye and the first cyan dye is from about 95/5 to about 30/70.

3. An ink-jet ink set according to claim 1, wherein the weight ratio of the amount of the black pigment to the total amount of the first yellow dye, the first magenta dye and the first cyan dye is from about 70/30 to about 5/95.

4. An ink-jet ink set according to claim 1, wherein a weight ratio of the first yellow dye to the first magenta dye to the first cyan dye is about 1/(about 0.5 to about 2)/(about 0.5 to about 2).

5. An ink-jet ink set according to claim 1, wherein the first yellow dye and the second yellow dye are the same yellow dye.

6. An ink-jet ink set according to claim 1, wherein the first magenta dye and the second magenta dye are the same magenta dye.

7. An ink-jet ink set according to claim 1, wherein the first cyan dye and the second cyan dye are the same cyan dye.

8. An ink-jet ink set according to claim 1, wherein the first yellow dye and the second yellow dye are the same yellow dye; the first magenta dye and the second magenta dye are the same magenta dye, and the first cyan dye and the second cyan dye are the same cyan dye.

9. An ink-jet ink cartridge comprising:
   an ink set having
   a black ink comprising a black pigment, a first yellow dye, a first magenta dye, and a first cyan dye, wherein a weight ratio of the amount of the black pigment to a total amount of the first yellow dye, the first magenta dye and the first cyan dye is from about 95/5 to about 5/95;
   a yellow dye ink comprising a second yellow dye;
   a magenta dye ink comprising a second magenta dye; and
   a cyan dye ink comprising a second cyan dye.

10. An ink-jet ink cartridge according to claim 9, wherein the first yellow dye and the second yellow dye are the same yellow dye.

11. An ink-jet ink cartridge according to claim 9, wherein the first magenta dye and the second magenta dye are the same magenta dye.

12. An ink-jet ink cartridge according to claim 9, wherein the first cyan dye and the second cyan dye are the same cyan dye.

13. An ink-jet ink cartridge according to claim 9, wherein the first yellow dye and the second yellow dye are the same yellow dye, the first magenta dye and the second magenta dye are the same magenta dye, and the first cyan dye and the second cyan dye are the same cyan dye.

14. An ink-jet ink cartridge according to claim 9, wherein a weight ratio of the first yellow dye to the first magenta dye to the first cyan dye is about 1/(about 0.5 to about 2)/(about 0.5 to about 2).

15. An ink-jet ink cartridge according to claim 9, wherein the weight ratio of the amount of the black pigment to the total amount of the first yellow dye, the first magenta dye and the first cyan dye is from about 95/5 to about 70/30.

16. A method of forming an image comprising:
    contacting a paper with a black ink having
    a black pigment, a yellow dye, a magenta dye, and a cyan dye, with a weight ratio of the amount of the black pigment to the total amount of the yellow dye, the magenta dye, and the cyan dye being from about 95/5 to about 5/95,
    wherein a weight ratio of the yellow dye to the magenta dye to the cyan dye is about 1/(about 0.5 to about 2)/(about 0.5 to about 2).

17. A method of forming an image according to claim 16, wherein the weight ratio of the amount of the black pigment to the total amount of the yellow dye, the magenta dye, and the cyan dye is from about 95/5 to about 70/30.

18. An image comprising:
    a paper; and
    a black ink comprising a black pigment, a yellow dye, a magenta dye, and a cyan dye, with a weight ratio of the amount of the black pigment to the total amount of the yellow dye, the magenta dye, and the cyan dye being from about 95/5 to about 5/95,
    wherein a weight ratio of the yellow dye to the magenta dye to the cyan dye is about 1/(about 0.5 to about 2)/(about 0.5 to about 2).

19. An image according to claim 18, wherein the weight ratio of the amount of the black pigment to the total amount of the yellow dye, the magenta dye, and the cyan dye is from about 95/5 to about 70/30.

* * * * *